United States Patent
Kremer-Davidson et al.

(10) Patent No.: US 8,849,631 B2
(45) Date of Patent: Sep. 30, 2014

(54) PROTOCOL INDEPENDENT TELEPHONY CALL LIFECYCLE MANAGEMENT SCHEME

(75) Inventors: Shiri Kremer-Davidson, Yavniel (IL); Alan Hartman, Haifa (IL); Mila Keren, Nesher (IL); Dmitri Pikus, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1652 days.

(21) Appl. No.: 12/119,554

(22) Filed: May 13, 2008

(65) Prior Publication Data

US 2009/0285375 A1 Nov. 19, 2009

(51) Int. Cl.
| | |
|---|---|
| G06G 7/48 | (2006.01) |
| G06F 9/455 | (2006.01) |
| G06F 9/44 | (2006.01) |
| G06F 17/30 | (2006.01) |
| H04L 29/06 | (2006.01) |
| H04M 3/42 | (2006.01) |
| H04M 7/00 | (2006.01) |

(52) U.S. Cl.
CPC ............ *H04M 3/42136* (2013.01); *G06F 8/24* (2013.01); *G06F 8/34* (2013.01); *G06F 17/3089* (2013.01); *H04M 7/006* (2013.01); *H04L 65/1016* (2013.01); *H04M 2201/54* (2013.01)
USPC ................................................ 703/6; 703/26

(58) Field of Classification Search
CPC ......... G06F 17/3089; G06F 8/24; G06F 8/34; H04M 2201/54; H04M 3/42136
USPC ....................................................... 703/6, 26
See application file for complete search history.

(56) References Cited

U.S. PATENT DOCUMENTS

| | | | |
|---|---|---|---|
| 5,961,584 A | 10/1999 | Wolf et al. | |
| 5,978,840 A | 11/1999 | Nguyen et al. | |

(Continued)

FOREIGN PATENT DOCUMENTS

| | | |
|---|---|---|
| EP | 1865697 A2 | 12/2007 |
| WO | WO/00/11885 A2 | 3/2000 |
| WO | WO-0023898 | 4/2000 |
| WO | WO/2007/065470 A1 | 6/2007 |

OTHER PUBLICATIONS

Mikko Setala, "Automated Distribution of UML 2.0 Designed Applications to a Configurable Multiprocessor Platform", 2006.*
Achilleas Achilleos, "An open Source Domain Specific Tools Framework to Support Model Driven Development of OSS", 2007.*
Tao Zhang, "A modeling Framework for Service Oriented Architecture", 2006.*

(Continued)

*Primary Examiner* — Omar Fernandez Rivas
*Assistant Examiner* — Angel Calle
(74) *Attorney, Agent, or Firm* — Novak Druce Connolly Bove + Quigg LLP

(57) ABSTRACT

A method of telephone call management in process of service development that allows a user to model and create telephone call management schemes independent of telecommunications protocols and network layer details. The method of the invention operates by creating an abstract model of a telephone call life-cycle that is converted, using a set of communication threads, into executable code. Models in accordance with the method of the invention are constructed using an Integrated Development Environment (IDE) for creating and developing telecom services that embodies the Telecom Service Domain Specific Language (TS-DSL) which is implemented as a Unified Modeling Language (UML) extension for the telecom domain. By this method, individuals without specialized knowledge of telecom related software programming and protocols can successfully design and implement telecom services that manages calls. The ease of implementation of the method also reduces design time and, therefore, time to market of the finished product.

1 Claim, 11 Drawing Sheets

(56) References Cited

U.S. PATENT DOCUMENTS

| | | | |
|---|---|---|---|
| 6,266,406 B1 | 7/2001 | Mercouroff et al. | |
| 6,393,481 B1* | 5/2002 | Deo et al. | 709/224 |
| 6,601,234 B1* | 7/2003 | Bowman-Amuah | 717/108 |
| 6,687,747 B1 | 2/2004 | Huang et al. | |
| 6,724,875 B1 | 4/2004 | Adams et al. | |
| 6,804,711 B1 | 10/2004 | Dugan et al. | |
| 7,216,348 B1 | 5/2007 | deCarmo | |
| 7,216,350 B2* | 5/2007 | Martin et al. | 719/315 |
| 7,277,700 B2 | 10/2007 | El Husseini et al. | |
| 7,373,142 B2 | 5/2008 | Scott | |
| 7,373,410 B2 | 5/2008 | Monza et al. | |
| 2003/0059028 A1 | 3/2003 | Lee et al. | |
| 2004/0028194 A1 | 2/2004 | McClung et al. | |
| 2005/0055211 A1 | 3/2005 | Claudatos et al. | |
| 2006/0085421 A1* | 4/2006 | Backhouse et al. | 707/10 |
| 2007/0198785 A1 | 8/2007 | Kogge et al. | |
| 2008/0084975 A1 | 4/2008 | Schwartz | |

OTHER PUBLICATIONS

Frank Alexander, Kraemer, "Aligning UML 2.0 State Machines and Temporal Logic for the Efficient Execution of Services", 2006.*

Chen et al., "Integrated TMN Service Provisioning and Management Environment," CITR Technical Journal [online], 1997, vol. 2, pp. 9-22, [retrieved on Apr. 9, 2008] Retrieved from the Internet: <URL: http://www.chapelhill.homeip.net/horton/CiTR/intranet/Information_Centre/Tech_Journals/Journal_copy/Journal1997_postsc/P1-IM97.pdf>.

Chen et al. "Integrated TMN Service Provisioning and Management Environment", CITR Technical Journal [online], 1997, vol. 2, p. 9-22, [retrieved on Apr. 9, 2008] Retrieved from the Internet<URL: http://www.chapelhill.homeip.net/horton/CiTR/intranet/Information_Centre/Tech_Journals/Journal_copy/Journal1997_postsc/P1-1M97.pdf>.

\* cited by examiner

PROTOCOL INDEPENDENT TELEPHONY CALL LIFECYCLE MANAGEMENT SCHEME

BACKGROUND

The present invention relates to the management of telephone calls. The telecommunications industry is rapidly evolving and expanding and new technologies are constantly being developed and introduced. These technologies create opportunities to develop services of value to customers. However, the pace at which these technologies are being introduced also means that service providers must be able to quickly respond and adapt to meet customer requirements.

Typically, the development of telecom services is performed by individuals with detailed knowledge of telecom protocols and software programming. The development process can be complicated and time consuming and often requires collaboration between programmers and telecom domain experts to properly address the programming details required in the development of services. Moreover, programming protocols in the telecom domain are fast changing with new ones being frequently introduced thereby requiring skilled individuals to continually update their knowledge base.

In view of the time, expertise, and expense typically required for programming development of telecom services, and the ever-changing nature of telecom programming protocols, it is desirable to have a telephone call management system that permits the management of the lifecycle of call without the need for specialized knowledge of programming protocols, software and the like.

SUMMARY

The present invention is directed to a method of telephone call management during service development process that allows a user to model and create telephone call management schemes independent of telecommunications protocols and network layer details. The method of the invention operates by creating an abstract model of a telephone call life-cycle that is converted, using a set of communication threads, into executable code. Models in accordance with the method of the invention are constructed using an Integrated Development Environment (IDE) for creating and developing telecom services that embodies the Telecom Service Domain specific Language (TS-DSL) which is implemented as a Unified Modeling Language (UML) extension for the telecom domain. By this method, individuals without specialized knowledge of telecom services and related software programming and protocols can successfully design and implement telecom services. The ease of implementation of the method also reduces design time and, therefore, time to market of the finished product.

An embodiment of the invention is a method for the creation of telecom services comprising selecting communication threads expressed in Domain Specific Language and representative of a elements of a telephone call from initiation to termination; assembling the selected communication threads into an abstract model of the telephone call; and controlling signaling communication of the telephone call with the communication threads.

Further, in the above embodiment the Domain specific language is implemented as a UML profile and a model library with Telecom specific abstractions of general modeling elements, and pre-compiled run time blocks that can be used together with other model elements.

Further, in the above embodiment the communication threads comprise a CallWrapper and can be created or deleted while the call is in progress.

DETAILED DESCRIPTION

The method of the invention is embodied in an IDE based on TS-DSL. TS-DSL is a UML extension for the telecom domain and is a language for defining Telecom services such as IP Multimedia Subsystems (IMS) Services abstracting over telecom domain specific architectures and protocols such as IMS, SIP, Diameter, SDP, etc.

This language is intended to be used by modelers who may or may not have telecom domain knowledge. In this regard, TS-DSL allows a user to model and create a telecom service in abstract form while hiding internal details from modelers thereby providing high level building blocks for designing Telecom Services. The service model building process is based on predefined types of services (partial models and templates) that the user selects for his newly created service model. Once a template type is selected, the user first configures its properties as required. The desired elements of the model are then generated. The model created by the framework of the template selected will contain predefined elements including state machines describing service behavior, a service specification as a black box and an additional placeholder for implementing the service as a white box.

Extending and modifying this initial model, a user can specify details of service behavior using a combination of state machines and Activity charts. Any model that complies with the validation rules will be transformed into code including its behavior. This transformation comprises an algorithm that maps both structural and behavioral elements of the Activity and State machine diagrams (like call and behavior actions and state and transitions) into executable Java code and other elements needed to create Telecom service based solely on the model. In this regard no human intervention is needed at the code level. All the required programming information is contained within the Telecom model which is at a higher level of abstraction than the application code. The TS-DSL enables modelers to define both the static and dynamic aspects of a Telecom Service. For this, it utilizes UML2 and IBM's "UML Profile for Software Services"; refining and extending it for the telecom domain. While an embodiment of the method is directed to IMS telecom services, a subset of TS-DSL can also be used to represent non-IMS telecom Services. In an embodiment, TS-DSL is implemented as an overlay to IBM's rational tool, RSA.

Figure 1:
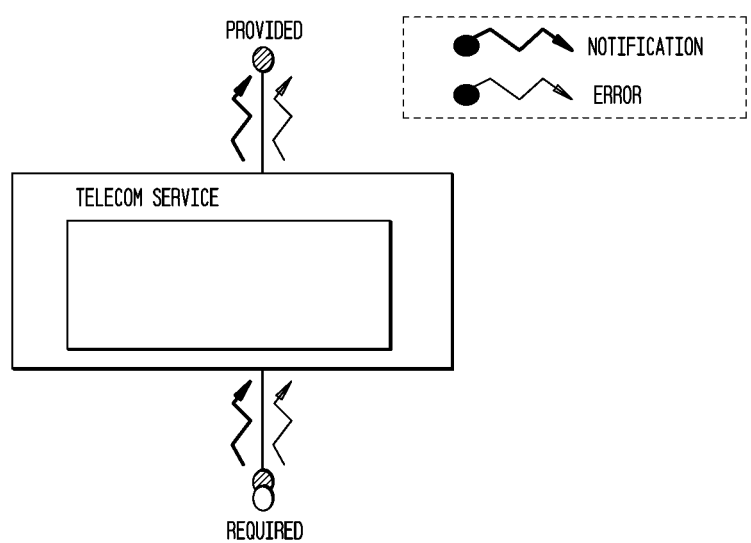
FIG. 1 is a schematic depicting a Telecom service as a black box in accordance with an embodiment of the invention.

In Service Oriented Architecture, (SOA) a service (defined by IBM's "UML Profile for Software Services") is a black box defining only the interfaces through which the outside world can communicate with it (known as Provided Interfaces) and what it requires from other services in order to operate as expected (known as Required Interfaces). This representation enables distinguishing a service representation from its implementation. In contrast to other service types, and as depicted in FIG. 1, Telecom Services require additional features in order to provide a meaningful abstraction over IMS Service communication patterns. These additional features include:

1. Ability to send notifications to other services/clients
2. Ability to accept and handle notifications from other services/clients
3. Ability to define what errors it might send out to its clients
4. Ability to define what errors it may be required to handle (send from the environment or used services)

Figure 2:
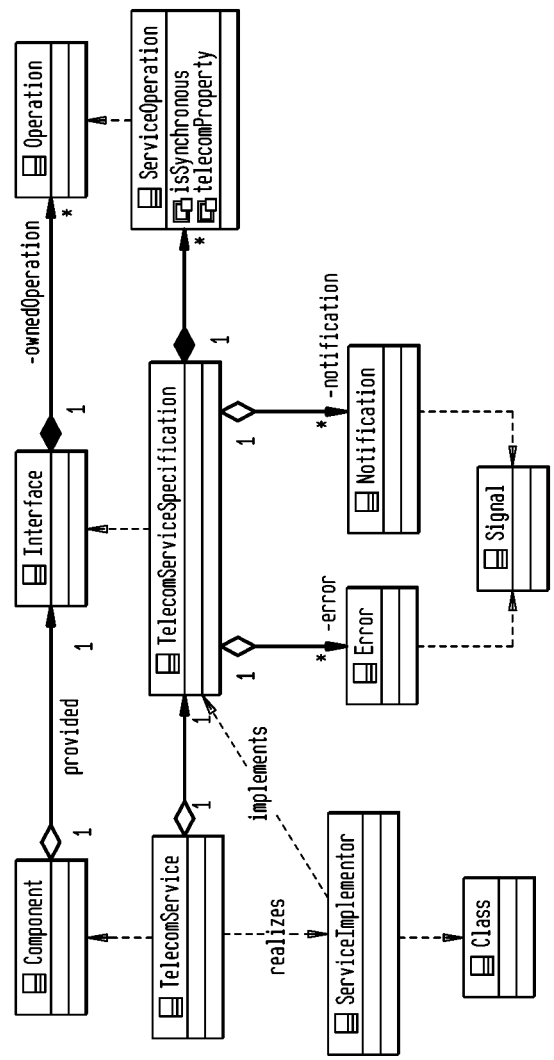
FIG. 2 is a high-level block diagram depicting a Meta-Model of a Telecom Service structure in accordance with an embodiment of the invention.
Figure 3:
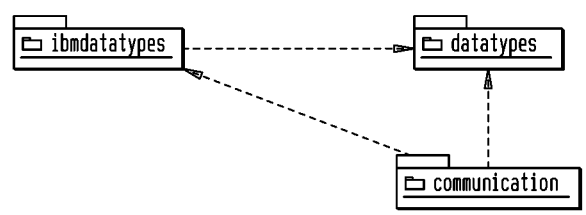
FIG. 3 is a high-level diagram depicting Telecom Model Library structure in accordance with an embodiment of the invention.

To provide these features in TS-DSL, the following elements, also depicted in FIG. 2 are defined:

1. TelecomService (extending Service): a service that interacts with the world via Operations, Notifications, and Errors.
2. Notification (extending Signal): A Signal that may be used to notify a client Service on some event. Typically sent out in Notification typed services following a subscribe routine. For example, one can define a SaleDetailsNotification which is sent out to registered clients when a store is having a sale.
3. TelecomError (extending Signal): A signal indicating that an Error has occurred in the system and that may require handling. E.g.: NetworkFailureError, RequestRefusedError.
4. TelecomServiceSpecification (extending ServiceSpecification): An Interface that exposes a set of operations that can be used to activate the service (if used as a provided interface) and operations through which the service is expected to use others (if used as a required interface). In addition it includes a list of Notifications and a list of Errors. These lists define what notification/ errors it may send out (provided) or may want/need to receive (required) depending on its role in the TelecomService.
5. ServiceOperation (extending Operation): An operation that exposes various characteristics of the potentially invoked service operation. Each TelecomService-Specification is expected to contain a non empty set of ServiceOperations. In the future other characteristics may be added.

Each ServiceOperation may have a set of parameters and return value. Some of the parameters can be tagged to specify an additional semantic role. For this version we defined the following semantic roles:

1. Originator (extends Parameter)—indicating that the parameter includes information on an originating service client
2. Target (extends Parameter)—indicating that the parameter includes information on an service initiated target To simplify the service modeling, the Telecom Service Creation Environment allows a designer to create a new TelecomService based on an existing template One such template, called Call Management template, contains a Call object of Communication Library (for more information see section below) to support this kind of telecommunication within the service model.

When using these templates, the service initial structure is generated automatically according to the template, thus providing the designer with a better starting point.

To further simplify the modeling task, TS-DSL defines a set of commonly used TelecomErrors and Notifications that can be used as-is in the service model. These elements are stored in the Telecom Model Library. In any case, designers can introduce proprietary Notifications and TelecomErrors within their model by stereotyping Signals accordingly.

A Telecom Model Library (discussed below) includes a set of predefined commonly used Errors and Notifications that can be used as-is by designers. Designers can introduce proprietary Notifications and Errors within their model by stereotyping their Signals accordingly. While UML provides support for errors, in TS-DSL an implicit type of Signal named "Error" is introduced. In TS-DSL, errors can be thrown from operation execution (specified via Operation's ThrownExceptions list) and by the service it self (defined via the provided TelecomServiceSpecification).

Model Libraries

When implementing a DSL over UML, there are two accepted ways to introduce entities into the target model. One is via a profile (described above) and the other is by introducing model libraries. A Model Library is a model that can be referenced from the target model and cannot be modified by it. It includes sets of entities that can be used as-is or as base elements (extended via generalization) inside the model. Their top level packaging and dependencies are depicted in FIG. 15. Models created in the SCE automatically reference this model library and the telecom profile will also be applied to the model. This allows designers to use predefined data types that are widely-used in Telecom service models, quickly and efficiently. In this section, various elements defined in the Communication Model Library and their relations are described.

Communication Library

The purpose of the TS-DSL Communication Library is to capture IMS Communications related aspects in an object oriented manner that is both flexible and high level. Transformations operate in conjunction with the model library and generate code from its contents. Transformations are not accomplished simply by a pure UML to Java transformation but, include significant amounts of additional code to close gaps defined by the model abstractions.

Figure 4:
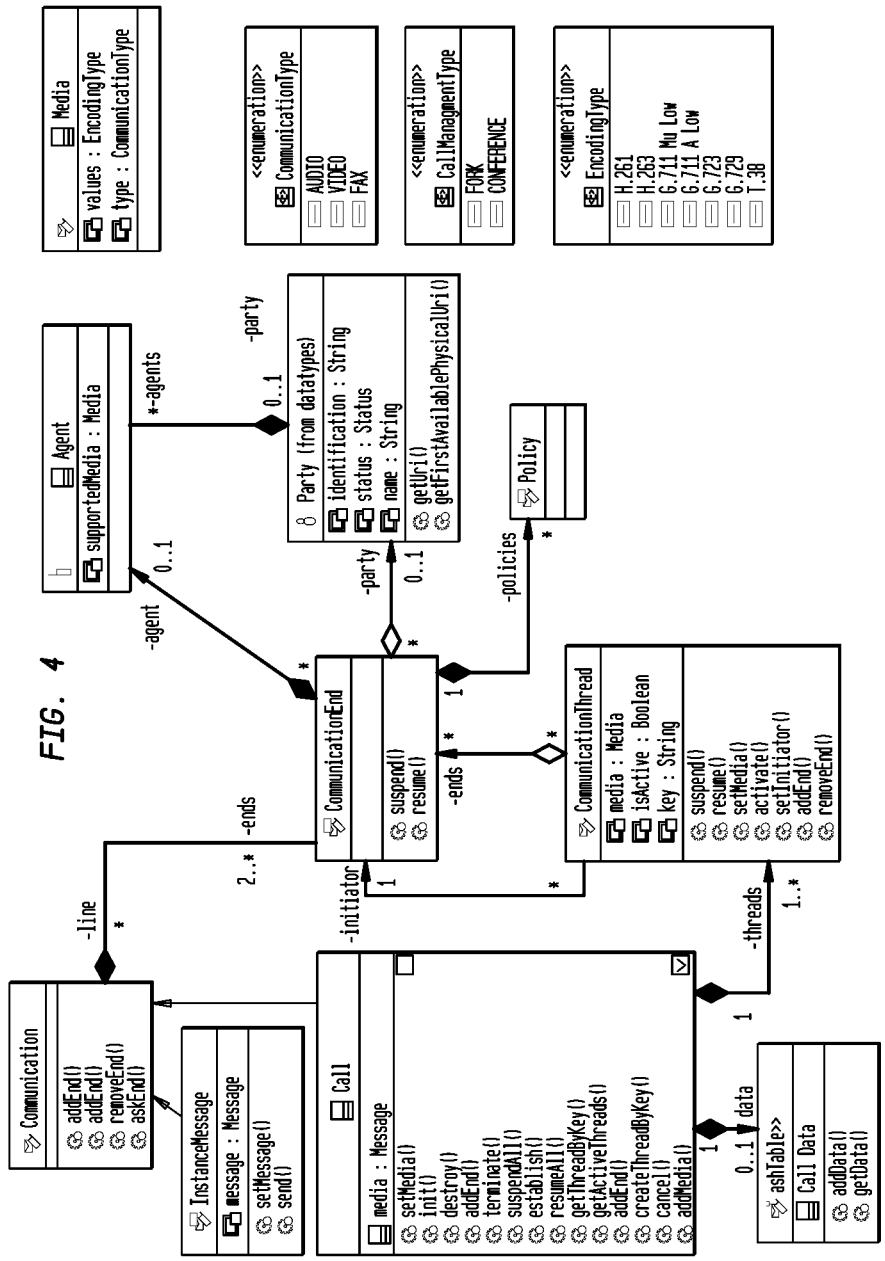
FIG. 4 is a high-level diagram depicting a Communication Library in accordance with an embodiment of the invention.

The following paragraphs describe the communication library entities depicted in FIG. 4.

Communication Targets

Figure 5:
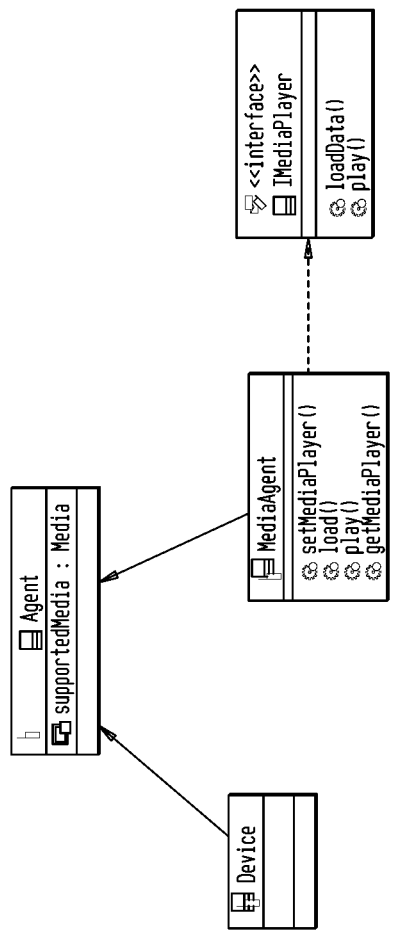
FIG. 5 is a high-level diagram depicting Agent Hierarchy in accordance with an embodiment of the invention.

TS-DSL defines an entity named Party that represents a participant. Some examples may include: target service, person, etc. Each Party may have an agent through which the actual communication is established. For example: representing his mobile phone, home computer, GPS, etc. In IMS, each Party may have more then one agent through which it can be reached (depending on the communication type needed and other factors). IMS is responsible to decide through which agent to communicate to the party if no particular agent is defined explicitly. To model this in TS-DSL a class named Agent is defined. It has a single attribute:
1. supportedMedia: a list of Media elements capturing the ways the agent can communicate (e.g. Audio, Video) and their related supported encoding types The library includes several concrete Agents. Some can be seen in FIG. 5.

Devise is a typical concrete Agent that represents for example a mobile phone, computer, etc.

MediaAgent is a special type of Agent. It is used to represent a service agent that can stream media (e.g. announcements, advertisements) in calls. It does so using a MediaPlayer (typically found in the provider environment) that can load media and stream it.

Communication

In TS-DSL, emphasis has been placed on modeling two types of communications: Call session and Instance Message. Both of these communications interact with parties in order to communicate. Instance message does so via messages sent to target clients, and Call does so by gathering a set of clients to a joined session.

To implement this TS-DSL defines a common abstract class named Communication that is responsible for setting up communication between participants as seen in FIG. 4. A Communication controls its participant list using a class named CommunicationEnd. Each Communication End points to a specific communication participant. CommunicationEnds can manipulate the state of the party in a communication according to need; as such each end may be either enabled or suspended. The exact state can be modified using the class operations:
1. Suspend( ): moving the participant to a suspended state for a period of time. This is an intermediate state that can change throughout the communication lifecycle.
2. Resume( ): resuming the participant's role in the communication CommunicationEnd has two optional references (multiplicity 0 . . . 1) but at any time at least one of them (if not both) must be set:
1. party: pointing to the client Party
2. agent: pointing to the client Agent (e.g. device or agent)
If both are references are set then the CommunicationEnd must point to a particular agent of the pointed party.

Note that in the case that only a Party is set, the transformation will include code that will invoke IMS services to select a proper agent for the task to be performed.

The Communication Class has various operations, among them are:
1. addend (Party): creates a new CommunicationEnd pointing at the party and adds it to its ends list
2. addEnd(Agent): creates a new CommunicationEnd pointing at the agent and adds it to its ends list
3. removeEnd(CommunicationEnd): removes the CommunicationEnd from the list. Child classes may overwrite this or add handling other aspects as well.

Call Entities

A Call is a statefull communication instance between participants. Once participants are connected, a media stream(s) is (are) established between them. The communication can be achieved through many channels supporting, for example, audio and/or video and/or others. Additionally, in IMS, a call can be established between more then two participants and at any time participants can be added or removed. In the telecom domain, establishing a call is not a trivial task. It includes among other things: SDP negotiations and numerous SIP signal interchanges until all ends are connected together.

Even after the call is established, many things can happen including: add/remove participants, changing settings like adding video to audio communication, etc. Services that manipulate calls need more functionalities than just setting the calls and adding or removing participants. For example, they may need to suspend or resume the entire call or a particular participant, they may need to add the service itself to the call as a participant to intervene for some tasks, they may need to limit some participants in what they can do on the call (e.g. cannot use video), etc.

To support all the above and to reduce as much as possible the need for the modeler to handle low level SIP, SDP, etc. and related tasks, Call and CommunicationThread Classes are defined in TS-DSL. A Call inherits from Communication. When it is created, the modeler can statically set the types of communication types and encodings it supports. This is stored in the Call attributes:
1. communicationType: a list of literals from the CommunicationType enumeration capturing the Call supported communicate types (e.g. Audio, Video)
2. encodingType: a list of literals from the EncodingType enumeration capturing the encoding types the Call supports.

Modelers can change these characteristics dynamically during the Call lifecycle. This will cause under-the-cover renegotiation via SDP during runtime. Moreover, an attempt to add a participant whose characteristics are not aligned with the ones specified in the Call will cause an Error.

A Communication Thread is a Class responsible for organizing the runtime aspect of a Call. It points to a set (or subset) of participants and specifies how they are grouped. It holds information on the thread initiator which is the end that initiated the Call. It also has an indication if it is active or suspended. Each Call is created with a single CommunicationThread instance. For most call management schemas, modelers will not need to define behavior that accesses or manipulates the CommunicationThread during the call lifecycle. Advanced schemas may require initiating more then one CommunicationThread and manipulating them. Therefore, each thread is created with a unique key that can be used to access it. Looking at all the active CommunicationThread instances at a particular time exposes the call topology.

The following are two examples of situations where more then one thread needs to be defined:
1. If a telecom service wants to intermittently interrupt a call with some information and it does not want to be a full time participant in a call (very important in message traffic management) a Call can be created with two threads, the first with the regular set of participants and the second including not only all participants but also the service itself as a participant. For most of the call lifecycle the first thread is active and the second is suspended. But when the service wants to interrupt, it suspends the first thread and activates the second. When it finishes it switches back to the first thread.
2. If a telecom service has participants with different user profiles indicating how exposed they are allowed to be in a call, then the Call can have a number of threads active simultaneously. Each thread will group participants with the same restriction level allowing them to do only what is allowed, e.g. restrict Video usage for non gold subscribers.

To support all of the above the CommunicationThread Class has the following Attributes:
1. isActive: a boolean indicating if it is active at a particular point
2. key: a String capturing the unique thread name 3. communicationTypes: a list of literals from the CommunicationType enumeration capturing the threads supported communicate types (e.g. Audio, Video)
4. encodingType: a list of literals from the EncodingType enumeration capturing the encoding types the thread supports.

The values within the communicationTypes and encodings list of a CommunicationThread instance can be only a subset of the ones defined by its containing Call instance.

The CommunicationThread Class has the following Operations (among others):
1. activates: activate the thread for the first time—setting its is Active flag to true. When only a single thread exists it is called from within the Call establish( ) method body.
2. suspends: suspends the call, setting its is Active flag to false.
3. resumes: resumed the call, setting its is Active flag to true.
4. addEnd(CommunicationEnd): adds an end to the thread
5. removeEnd(CommunicationEnd): removes an end from the thread
6. setInitiator(CommunicationEnd): sets the thread initiator. May also be used for charging for example.

The Call class has a single basic Operation named establish( ) that is responsible for setting up a call between the participants according to the entered information. It will do the SDP negotiation and control the SIP message exchange until all participants are connected. Call has additional Operations that are normally used in advanced situations (when manipulating more then one thread):
1. suspendAll( ): suspends all threads(also moves is Active flag in all to false)
2. resumeAll( ): resumes all threads (also moves is Active flag in all to true)
3. getThreadByKey(String): returns a CommunicationThread that has the passed Key
4. getActiveThreads( ):returns all CommunicationThreads whose is Active flag is true
5. addEnd(CommunicationThread, Party): creates a CommunicationEnd for the Party (if does not exist) and adds it to the specified thread
6. addEnd(CommunicationThread, Agent): creates a CommunicationEnd for the Agent (if does not exist) and adds it to the specified thread.
7. addMedia(Media): add the Media object to the list of supported Media
8. removeMedia(Media): remove the Media from the list of supported Media. This may limit some of the participant's ability to continue to participating in the call.

When a call is created, the modeler can statically set its supported Media. This is stored in the Call attribute media that is a list of Media entities capturing the Call supported communicate types (e.g. Audio, Video) and related supported encoding types.

Modelers can change these characteristics dynamically during the Call lifecycle. This will cause under-the-cover renegotiation via SDP during runtime. Moreover, an attempt to add a participant whose characteristics are not aligned with the ones specified in the Call will cause an Error.

Since a call is a stateful session entity it may store session data that can be used during the call lifecycle. Modelers can define such data in two manners:
1. Using the Call's CallData Hashtable. Modelers can add (string, value) pairs and extract them when needed
2. Define a Class in their Telecom Service model that inherits from Call and its attributes will be seen as session data as well.

Two enumerators were defined above and depicted in FIG. 4, to capture and abstract over various characteristics related to a communication participant:
1. CommunicationType: indicating they type of communication that is supported or expected. It includes: Audio, Video and Fax.
2. EncodingType: indicating the encodings that are supported.

Figure 6:
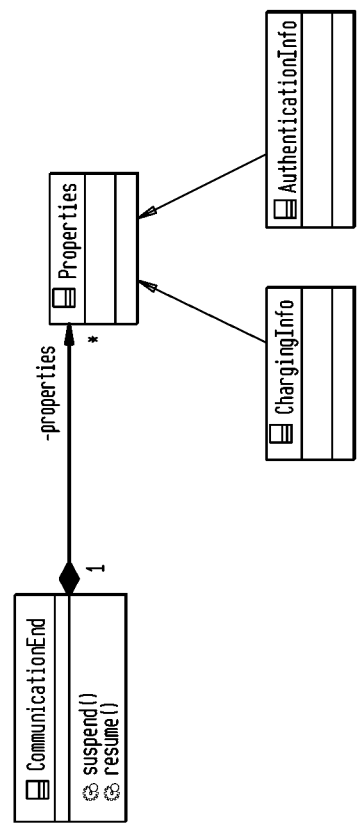
FIG. 6 is a high-level diagram depicting IMS properties in accordance with an embodiment of the invention.

When a communication is in progress between participants (regardless if state full or state less) there are various policies and requirements that IMS can handle. This includes among others: charging and authentication. To be generic, TS-DSL includes an abstract Class named Properties that can hold information on how these characteristics are set for the participant. This and CommunicationEnd, ChargingInfo and AuthenticationInfo classes are depicted in FIG. 6. CommunicationEnd can contain a set of its concrete instances by value. Classes ChargingInfo and AuthenticationInfo are placeholders and are provided so modelers who need these parts can extend these elements and provide proprietary support for them.

Telecom Signals /Meta-Model Extensions

Figure 7:
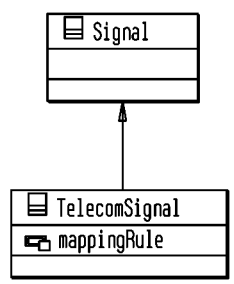
FIG. 7 is a high-level diagram depicting a Telecom Signal in accordance with an embodiment of the invention.

In certain circumstances it is anticipated that the telecom domain modeler will need to further manipulate the regular communication behavior. For example, he may want to add some functionality when a Ringing SIP Signal (175) arrives in a call establishment process. For this TS-DSL defines an additional type of Signal named TelecomSignal which abstracts over SIP messages. This signal type is depicted in FIG. 7 and includes an attribute named mappingRule through which modelers are expected to indicate to what actual SIP message type and under what message body values it is triggered inside the model.

Figure 8:
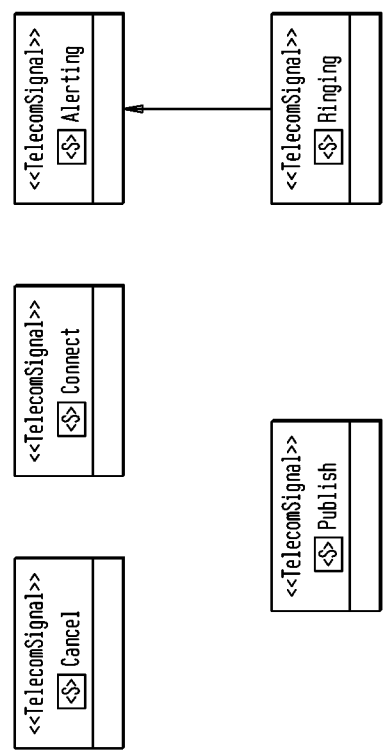
FIG. 8 is a high-level diagram depicting Basic Telecom Signals in accordance with an embodiment of the invention.

The Model library includes a few common TelecomSignals depicted in FIG. 8 that can be used by the modeler such as: Ringing and Connect. Modelers can define a proprietary TelecomSignal by creating a Signal, stereotyping it as a TelecomSignal and then specifying the mapping rule in the stereotype attribute.

A Telecom Signal cannot be manipulated since it is only intended for the modeler to be able to customize the normal communication behavior not interrupt it.

The Call entity can be customized using TelecomSignals. Modelers are expected to specify what Activity to activate for particular TelecomSignals. These Activities can be activated on two occasions:
1. Before the call sends out a corresponding TelecomSignal
2. After a TelecomSignal has arrived to the Call.

These activities can be seen as hooks into the normal Call behavior.

A UML Class can contain a set of Receptions which are responsible to match a Signal that it may receive asynchronously to the behavior that is to be invoked to handle it.

Figure 9:
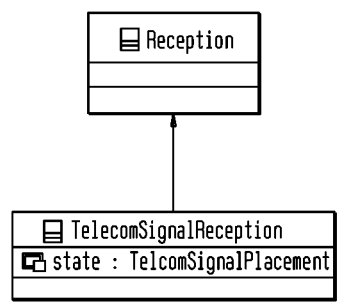
FIG. 9 is a high-level diagram depicting Telecom Signal Reception in accordance with an embodiment of the invention.

TS-DSL defines the TelecomSignalReception (extending Reception) which specifies what Activity to activate on a particular type of TelecomSignal as depicted in FIG. 9. Its "state" attribute is a TelecomSignalPlacement enumeration value that can either be PreSend—if activity is to run before the signal is sent, or PostReceive—if the activity is to run just after such a signal arrives. The activities that are referenced from the TelecomSignalReception will include an indication of the reason they were activated; thus similarly to how Notifications were handled in the meta-model, TelecomSignalTrigger (extending SignalTrigger) and AcceptTelecomSignalAction (extending AcceptEventAction) are defined to represent the event and starting point action in the activity.

CallWrapper

TS-DSL and its elements as described above comprise an IDE that designers and modelers can use as a tool to create telecom services. Using the elements discussed above, telecom services can be designed and implemented by creating a model of the services desired in abstract form and then transforming the abstractions into executable code.

Figure 10:
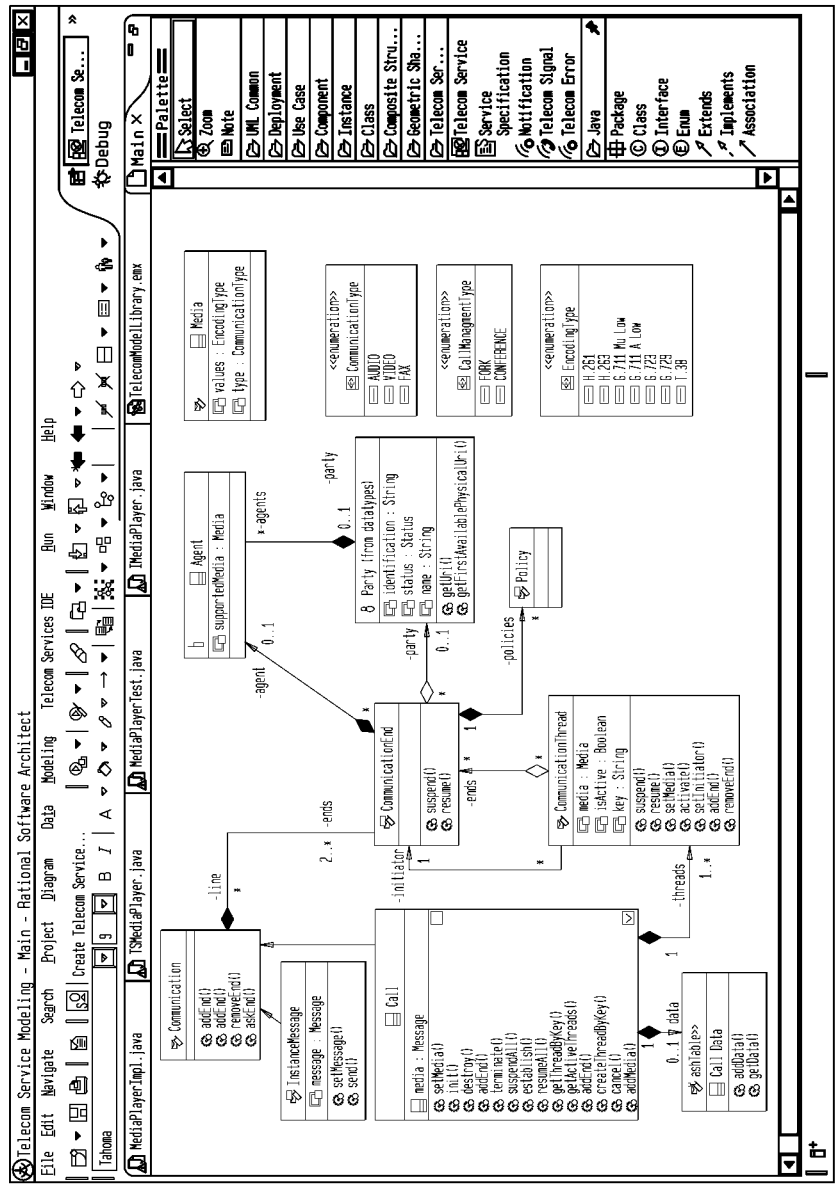
FIG. 10 is a high-level diagram depicting an implementation of a method in accordance with an embodiment of the invention.

In an embodiment of the invention, the IDE is utilized to create an abstraction over telephone communication schemas using the threading concepts described above. In this abstract model, a CallWrapper is defined that represents a single call from initiation to termination. The signalling communication of a Call is managed by a set of Communication Threads that are contained in a CallWrapper. The Communication Thread is a logical thread that manages a set of call parties with some common characteristics. Similar to operating system threads, multiple CommunicationThreads can be active in parallel, providing virtual partitioning of a single call. For improved flexibility, the model allows a set of threads to be suspended wile others are active. Suspended threads can be resumed and re-suspended in the scope of a single call many times. This enables dynamically changing call configurations under changing circumstances a (e.g. network events or caller initiated events). FIG. 10 describes an implementation of this model using UML notation.

Figure 11:
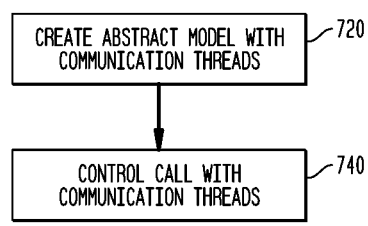
FIG. 11 is a flowchart depicting a method for the management of telephone calls in accordance with an embodiment of the invention.

Communication Threads can be created or deleted while the call is in progress. This enables managing changing communicating configuration in a single call instead of trying to manage multiple Calls and maintaining them somehow in a single session. Parties can be added or removed from a Call and/or Communication Threads at any point. A party can also be suspended or resumed from a call regardless of its participation in the different threads. Once resumed, it will reclaim its role in the different threads. FIG. 11 discloses the method of telephone call management utilizing Communication threads. As is depicted therein, a method of controlling telephone calls in accordance with the invention comprises creating an abstract model of a telephone call from initiation to termination with a set of Communication threads. This is depicted as step 720 in FIG. 11. Once a set of Communication threads representing the telephone call is established, the call is then automatically controlled solely by the Communication Threads, thereby obviating the need to manipulate telecommunication protocols and network layer details. This step is depicted as step 740 of FIG. 11.

It should be noted that the embodiment described above is presented as one of several approaches that may be used to embody the invention. It should be understood that the details presented above do not limit the scope of the invention in any way; rather, the appended claims, construed broadly, completely define the scope of the invention.

What is claimed is:

1. A method of managing a lifecycle of a telephone call comprising:
   creating an abstract model of telecommunication services to be provided during a call, comprising:
      creating an abstract model of the call;
      defining, based on the abstract model of the call, a plurality of communication threads to manage the abstract model of the call from initiation to termination;
      wherein said communication threads are active in parallel and can be activated or deactivated as desired during the call;
   translating the defined communication threads into executable software code;
   establishing a real telephone call; and
   executing the executable software code of the defined communication threads to manage the real telephone call over the lifecycle of the telephone call;
   wherein the real telephone call is controlled by the defined communication threads, without manipulation of telecommunications protocols and/or network layers.

* * * * *